United States Patent
Spieser et al.

(10) Patent No.: US 8,891,385 B2
(45) Date of Patent: Nov. 18, 2014

(54) VALIDATING ETHERNET VIRTUAL CONNECTION SERVICE

(75) Inventors: Frederic Spieser, Encino, CA (US); Abhishek Sinha, Woodland Hills, CA (US)

(73) Assignee: Alcatel Lucent, Boulogne-Billancourt (FR)

(*) Notice: Subject to any disclaimer, the term of this patent is extended or adjusted under 35 U.S.C. 154(b) by 395 days.

(21) Appl. No.: 12/984,213

(22) Filed: Jan. 4, 2011

(65) Prior Publication Data

US 2012/0170465 A1 Jul. 5, 2012

(51) Int. Cl.
*H04J 3/14* (2006.01)
*H04L 12/26* (2006.01)
*H04L 12/24* (2006.01)
*H04L 12/28* (2006.01)

(52) U.S. Cl.
CPC ........ *H04L 12/2697* (2013.01); *H04L 41/5009* (2013.01); *H04L 43/50* (2013.01)
USPC .......................................... 370/252; 370/249

(58) Field of Classification Search
CPC ............................ H04J 3/14; H04J 2203/0085
USPC .................................................. 370/249, 252
See application file for complete search history.

(56) References Cited

U.S. PATENT DOCUMENTS

| | | | |
|---|---|---|---|
| 2003/0163772 A1* | 8/2003 | Jaworski | 714/704 |
| 2003/0223376 A1* | 12/2003 | Elliott et al. | 370/249 |
| 2006/0288409 A1* | 12/2006 | Bartal et al. | 726/11 |
| 2007/0211640 A1* | 9/2007 | Palacharla et al. | 370/241 |
| 2009/0232016 A1* | 9/2009 | Pruthi et al. | 370/252 |

* cited by examiner

*Primary Examiner* — Un C Cho
*Assistant Examiner* — Mostazir Rahman
(74) *Attorney, Agent, or Firm* — Garlick & Markison

(57) ABSTRACT

A network element in an Ethernet network comprises circuitry configured for providing a plurality of different functionalities. A first portion of the circuitry is configured for providing traffic generator functionality is provided. A second portion of the circuitry is configured for providing traffic analyzer functionality. A third portion of the circuitry is providing traffic loop-back functionality. The various portion of the circuitry (i.e., the circuitries) are operable for selectively enabling the network element to support a unidirectional test mode and a bi-directional test mode and for enabling the network element to be selectively operated as a local network element and a remote network element.

13 Claims, 6 Drawing Sheets

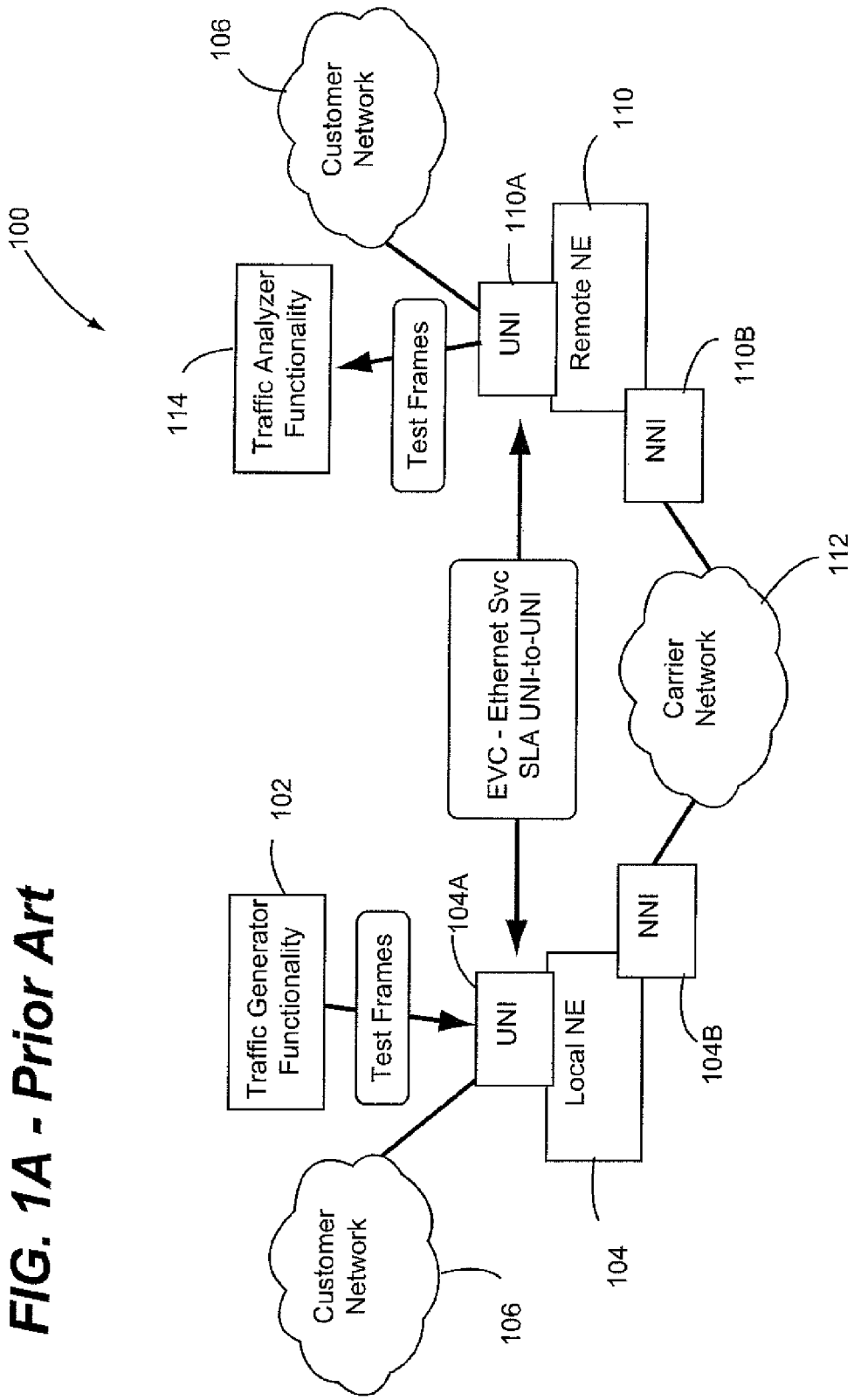
FIG. 1A - Prior Art

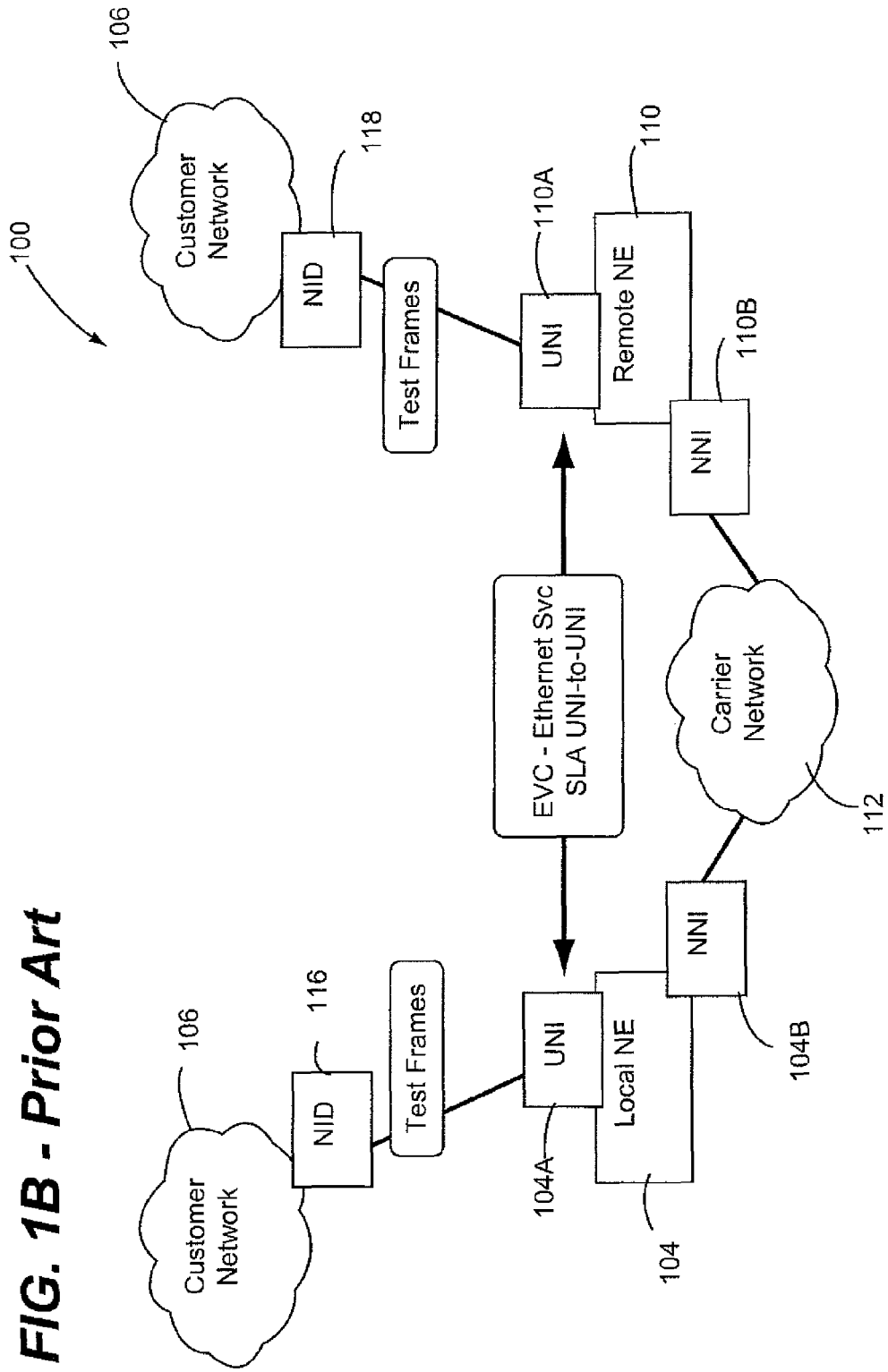
FIG. 1B - Prior Art

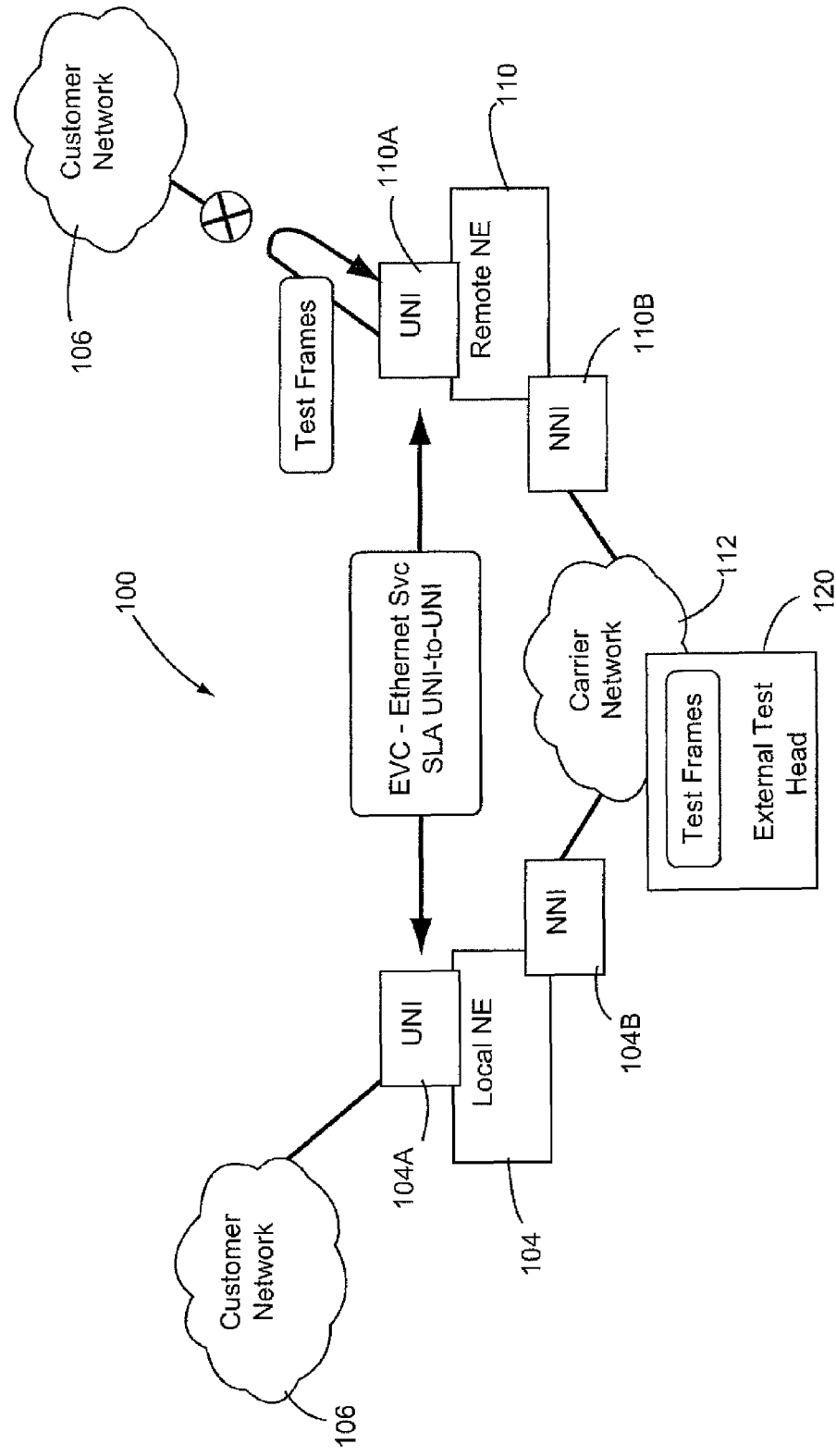
FIG. 1C - Prior Art

VALIDATING ETHERNET VIRTUAL CONNECTION SERVICE

FIELD OF THE DISCLOSURE

The disclosures made herein relate generally to providing service in an Ethernet network and, more particularly, to validating Ethernet Virtual Connection (EVC) service provided to a customer in a Ethernet network customer.

BACKGROUND

An Ethernet Virtual Connection (EVC) refers to a logical relationship between Ethernet user-to-network interfaces (UNI) in a provider-based Ethernet Service. A Metro Ethernet is a computer network that covers a metropolitan area and that is based on the Ethernet standard. Furthermore, a Metro Ethernet is commonly used as a metropolitan access network to connect subscribers and businesses to a larger service network, the Internet, and/or other network system.

In a Metro Ethernet Network, the provider (e.g., an operator) often has the need to validate the EVC service provided to a customer. This validation typically consists of verifying a Service Level Agreements (SLA) associated with the EVC service. Performing this validation is critical when a new service is provisioned in the Metro Ethernet Network and when a live service needs troubleshooting. Validating for a new service generally requires an out-of-service test and troubleshooting a live service generally requires an in-service test. In one example, a main objective of a Metro Ethernet Network operator is to perform a network test according to RFC (Request For Comments) 2544.

According to the Metro Ethernet Forum (MEF) recommendations, SLA validation comprises measurements relating to packet loss, packet delay and packet delay variance. To this end, in order to provide an accurate SLA validation, it is critical to validate the network between the end points of the Ethernet Service (e.g., User Network Interface (UNI) ports), so that the Quality of Service (QOS) requirements set for the Ethernet Services are honored (i.e., EVC Ethernet Service UNI-to-UNI SLA verification). To this end, as shown within the network system 100 in FIG. 1A, traffic generator functionality 102 causes test frames to be injected at a UNI port 104A of a local network element 104, which are also connected to a customer networks 106. The local network element 104 is connected to a remote network element 110 through a carrier network 112. The carrier network 112 is connected to each one of the network elements 104, 110 through their respective network-to-network interface ports 104B, 110B. Traffic analyzer functionality 114 causes the test frames received at a UNI port 110A of the remote network element 110 to be analyzed.

Various solutions exist to deploy traffic generators and analyzers within the Metro Ethernet Network to test a customer Ethernet Service and verify the Service Level Agreement (SLA) associated to the service. These external traffic generators and analyzers must be connected to the UNI ports in order to test the Ethernet Service and implies that only out-of-service tests can be performed. A skilled person will appreciate that management of this traffic generator and analyzer equipments and the tests that need to be performed is not trivial and often requires proprietary software applications. For example, the operator has to individually configure separate test devices and traffic generators using disparate configuration options and, in general, management agents (i.e., agents of a network management system (NMS)) don't get a unified picture of the configuration and test results.

One known (i.e., prior art) solution for carrying out EVC validation relies upon the use of one or more network interface devices (NIDs). FIG. 1B depicts such a NID based solution in the context of the network system discussed above in reference to FIG. 1A. A local NID 116 and a remote MD 118 serve as a demarcation point between the carrier network 112 and the customer network 106. The NIDs 116, 118 can each offer an integrated traffic generator and traffic analyzer allowing in-band network performance measurement between both end points of the Ethernet Service (i.e., UNI port 104A and UNI port 110A). This solution exhibits relatively high capital expenditure for the service provider because two NIDs 116, 118 must be deployed for each customer point-to-point Ethernet Service. Accordingly, with large service provider networks, the solution can become too expensive.

Another known solution for carrying out EVC validation relies upon the use of a centralized test head. FIG. 1C depicts such a centralized test head based solution in the context of the network system discussed above in reference to FIG. 1A. A test can be started from a centralized test head 120. Typically, the test head 120 is connected in a network element within the carrier network 112 and test frames are injected from the carrier network 112 into a port of the network element 104. In combination with loop-back functionality on the network element, test frames are looped back by the remote network element 110 (i.e., the targeted network element) for delivery to the centralized test head 120 for performance measurements. This solution has the drawback of not validating the network path between the customer endpoints.

In view of the shortcomings associated with know solutions for carrying out EVC validation, a network element serving as an access switch or provider edge for providing a test generator/analyzer functionality that allows an service provider (e.g., operator) to validate the Metro Ethernet network between the end points of the customer Ethernet Service would be useful, advantageous and novel.

SUMMARY OF THE DISCLOSURE

Embodiments of the present invention enable are configured for enabling EVC validation to be carried out in a Metro Ethernet network. More specifically, embodiments of the present invention provide for a network element that is configured for providing test generator/analyzer functionality that allows a service provider to validate the Metro Ethernet network between endpoints of the customer Ethernet Service. In doing so, embodiments of the present invention allow customer service level agreement (SLA) to be validated with minimal or negligible capital expenditures associated with deployment of demarcation devices (e.g., NIDs).

Through use of equipment configured in accordance with the present invention, a network administrator will be afforded with validation mechanism that offers several beneficial attributes. One such beneficial attribute includes being able to remotely debug network problems without causing any disruption to network service. Another such beneficial attribute includes being able to perform validation tests in a manner that closely matches end-to-end traffic condition as experienced by customer traffic without modifying any of the network elements. Another such beneficial attribute includes enabling EVC validation advantageously includes carrying out both uni-directional and bi-directional tests. Still another such beneficial attribute includes reducing deployment capital expenditures by eliminating the need of NIDs. Yet another such beneficial attribute includes saving cost by providing remote test capability to the network administrator thus saving end customer service visits.

In a typical Ethernet network, an NMS will already be deployed using Simple Network Management Protocol (SNMP) to manage the Metro Ethernet Network and Ethernet Services. SNMP is a User Datagram Protocol (UDP) based network protocol that is typically used in network management systems to monitor network-attached devices for conditions that warrant administrative attention. By having test head functionality within a network element, management of the Ethernet Service tests would become part of the NMS solution. This will provide the network administrator a consolidated view of all the tests and the participating Test Elements, which will significantly aid the network administrator to configure, monitor and debug the network in a more effective manner. Accordingly, embodiments of the present invention can be configured for providing a comprehensive, unified, and operating expense-reducing SNMP framework for a NMS solution capable of managing Ethernet Service tests.

In one embodiment of the present invention, a network element in an Ethernet network comprises circuitry configured for providing a plurality of different functionalities. A first portion of the circuitry is configured for providing traffic generator functionality is provided. A second portion of the circuitry is configured for providing traffic analyzer functionality. A third portion of the circuitry is providing traffic loop-back functionality. The various portion of the circuitry (i.e., the circuitries) are operable for selectively enabling the network element to support a unidirectional test mode and a bi-directional test mode and for enabling the network element to be selectively operated as a local network element and a remote network element.

In another embodiment of the present invention, a non-transient computer-readable medium has tangibly embodied thereon and accessible therefrom a set of instructions interpretable by at least one data processing device. The set of instructions is configured for causing the at least one data processing device to performed operations for providing traffic generator functionality, providing traffic analyzer functionality, and providing traffic loop-back functionality. The operations are performed in a manner for selectively enabling the network element to support a unidirectional test mode and a bi-directional test mode and for enabling the network element to be selectively operated as a local network element and a remote network element.

In another embodiment of the present invention, a network element configured for routing traffic within an Ethernet network comprises at least one data processing device, instructions processable by the at least one data processing device, and an apparatus from which the instructions are accessible by the at least one data processing device. The instructions are configured for causing the at least one data processing device to provide traffic generator functionality, to provide traffic analyzer functionality, and to provide traffic loop-back functionality. Providing the traffic generator functionality includes generating test frames at any combination of packet size and frame generation rate, uniquely identifying the test frames and non-test frames through use of a respective signature thereof, associating a hardware timestamp with each one of the test frames, maintaining a count of the test frames transmitted from the network element, and supporting both an in-service test mode and an out-of-service test mode. Providing the traffic analyzer functionality includes maintaining a count of test frames received at the network element, filtering the test frames dependent upon the respective signature thereof, associating a hardware timestamp with each one of the test frames, and calculating a frame delay for each one of the test frames. Providing the traffic loop-back functionality includes uniquely identifying each one of the test frames dependent upon the respective signature thereof, selectively activating a network element loop-back mode for re-injecting test frames egressing an interface of the network element back into the interface, and supporting both the in-service test mode and the out-of-service test mode. The functionalities are jointly operable for selectively enabling the network element to support a unidirectional test mode and a bi-directional test mode and for enabling the network element to be selectively operated as a local network element and a remote network element.

These and other objects, embodiments, advantages and/or distinctions of the present invention will become readily apparent upon further review of the following specification, associated drawings and appended claims.

BRIEF DESCRIPTION OF THE DRAWINGS

FIG. 1A is a diagrammatic view showing a functionality required to carry out SLA UNI-to-UNI verification of EVC Ethernet Service within a network system.

FIG. 1B is a diagrammatic view showing a NID based solution for carrying out SLA UNI-to-UNI verification of EVC Ethernet Service within the network system of FIG. 1A.

FIG. 1C is a diagrammatic view showing a centralized test head based solution for carrying out SLA UNI-to-UNI verification of EVC Ethernet Service within the network system of FIG. 1A.

DETAILED DESCRIPTION OF THE DRAWING FIGURES

Figure 2A:
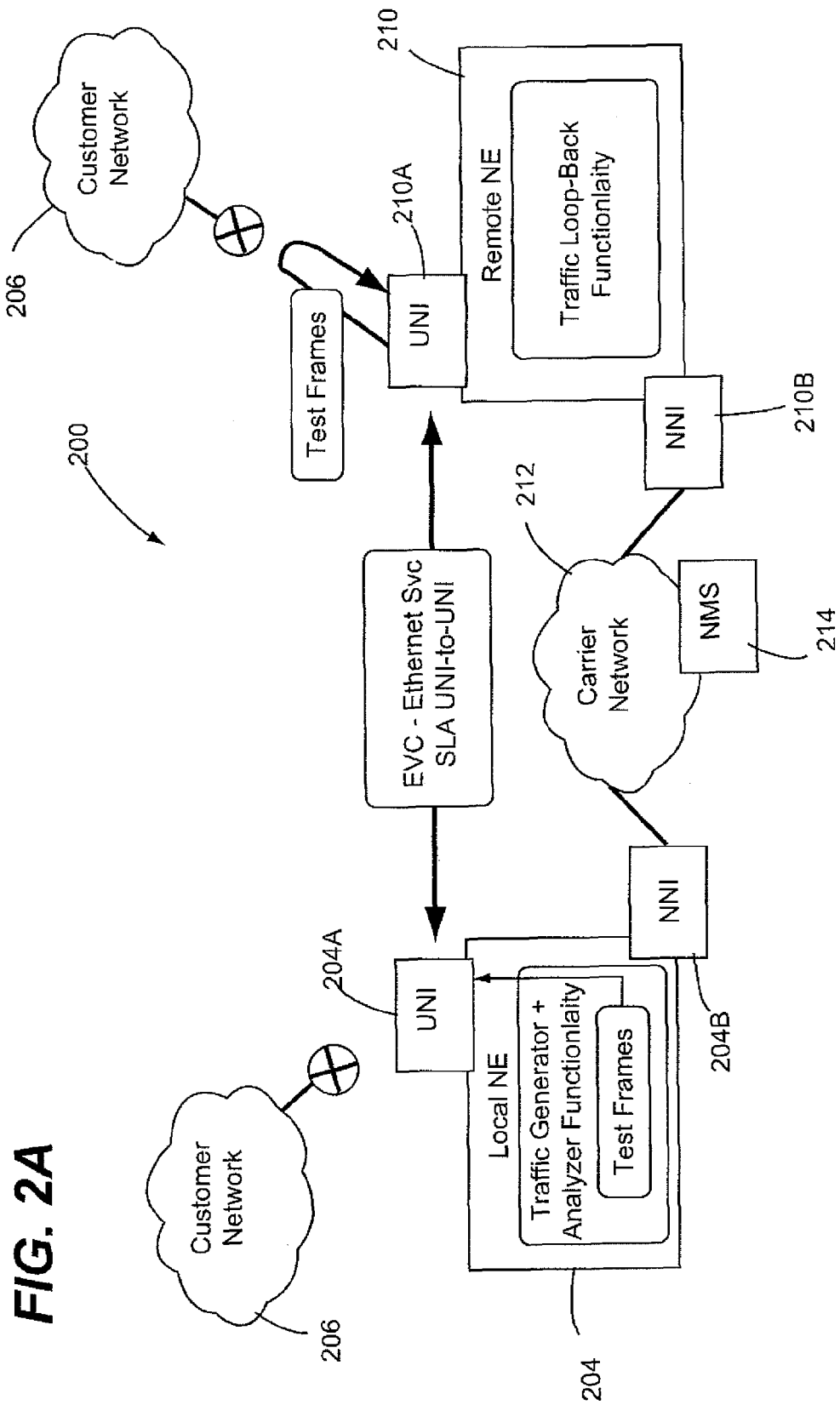
FIG. 2A is a diagrammatic view relating to a method configured in accordance with an embodiment of the present invention for carrying out SLA UNI-to-UNI verification Of EVC Ethernet Service utilizing an out-of-service bi-directional test mode.

A network element configured in accordance with an embodiment of the present invention will be provide various functionalities for allowing carrying out SLA UNI-to-UNI verification of EVC Ethernet Service within a network system. Such a network element will be selectively operable as a local network element or a remote network element during such SLA UNI-to-UNI verification. For enabling SLA UNI-to-UNI verification in both uni-directional and bi-directional modes of operation, a network element configured in accordance with the present invention will be able to provide traffic generator functionality, traffic analyzer functionality, traffic loop-back, and required combinations thereof. Such functionalities and combinations thereof are examples of network element role functionality in accordance with the present invention. During uni-directional test mode, a network element configured in accordance with the present invention will provide traffic generator functionality when operating as a local network element and will provide traffic analyzer functionality when operating as a remote network element. During bi-directional test mode, a network element configured in accordance with the present invention will provide traffic generator functionality and traffic analyzer functionality when operating as a local network element and will provide traffic loop-back functionality when operating as a remote network element.

Traffic generator functionality includes various functions that provide for generating and transmitting of test frames between UNI ports of network elements at respective customer endpoints within an Ethernet network system. One example of such a traffic generator function includes generating test frames at any rate and any packet size. The frame definition can include L2, L3 and L4 headers. Specifically to Ethernet Service that provides L2 services, the L2 header definition is important for VLAN and priority (802.1p). Frame generation shall be such that transmission thereof includes the configuration of packet size, test duration (e.g., in either time or number of frames), and network element interface identifier (e.g., number) corresponding to the interface on which the test frames are to be injected. Another example of such a traffic generator function includes designating a frame signature to differentiate test frames versus non-test frames. Another example of such a traffic generator function includes adding a hardware timestamp on test frames being generated. Another example of such a traffic generator function includes supporting in-service and out-of-service test modes. During the out-of-service test mode, the network element interface on which the test frames are injected is non-operational such that all non-test frames received and transmitted thereon are discarded. During the in-service test mode, the network element interface on which the test frames are injected remains operational such that there can be a mix of test frames and non-test frames (e.g., customer frames). However, during the in-service test mode, test frames can be injected in a manner permitting a drop-eligible indication. Yet another example of such a traffic generator function includes a count (e.g., a counter) of a number of test frames injected to the network element interface port and a count (e.g., a counter) of a number of test frames sent out of the network element (e.g., from an interface port thereof). Such frame counts relating to frame generator functionality can support frame loss measurement.

Traffic analyzer functionality includes various functions that provide for analysis of the test frames (e.g., reception attributes and/or transmission attributes thereof). One example of such a traffic analyzer function includes filtering the test frames based on the test frame signature. Another example of such a traffic analyzer function includes maintain count of the number of test frames being received a designed network element (e.g., interface port thereof), thereby allow end-to-end frame loss measurement when used in combination with counts of test frames transmitted from a designated network element (e.g., interface port thereof). Another example of such a traffic analyzer function includes adding a hardware timestamp to test frames being received at a network element (e.g., at a interface port thereof). Yet another example of such a traffic generator function includes calculating frame delay for each test frame being received at a network element (e.g., at a interface port thereof).

Traffic loop-back functionality includes various functions that provide for analysis of the test frames. One example of such a traffic loop-back function includes identifying test frames based on the test frame signature. Another example of such a traffic loop-back function includes configuring a network element interface in a loop-back mode that will re-inject the test frames egressing form that network element interface back to that network element interface. Another example of such a traffic loop-back function includes swapping test frame source and destination MAC addresses during such re-injection. Another example of such a traffic loop-back function includes supporting an in-service test mode and an out-of-service test mode. During the out-of-service test mode, the network element interface set in loop-back mode is non-operational such that all non-test frames received and transmitted are discarded. During the in-service test mode, the network element interface set in loop-back mode remains operational such that test frames are mixed with customer frames. However, during the in-service test mode, test frames can be re-injected in a manner permitting a drop-eligible indication Referring now to FIG. 2A, a method configured in accordance with an embodiment of the present invention for carrying out SLA UNI-to-UNI verification of EVC Ethernet Service utilizing an out-of-service bi-directional test mode is presented. This bi-directional test mode method is discussed in reference to a network system 200, which is depicted in FIG. 2A. The network element 200 includes a carrier network 212 coupled to a customer network 206 via two network elements. During the SLA UNI-to-UNI verification, a first one of these network elements serves as a local network element 204 and a second one of these network elements serves as a remote network element 210. Each one of the network elements 204, 210 is coupled to the customer network 206 through a respective UNI port 204A, 210A and is coupled to the carrier network 212 through a respective NNI port 204B, 210B.

In a preferred embodiment, a network management system (NMS) 214 can coupled to the carrier network 212. The NMS 214 (e.g., a module thereof) is configured for controlling the various functionalities that network elements configured in accordance with the present invention are provide with (e.g., traffic generator, traffic analyzer and traffic loop-back functionalities). In this manner, network elements configured in accordance with the present invention have an integral test head arrangement that can be managed using the NMS framework 214.

The bi-directional test mode method begins with an operation for setting both the local UNI port 204A and the remote UNI port 210A to being out-of-service. Accordingly, communication between the local and remote network elements 204, 210 via their respective UNI ports 204A, 210A is disabled. An operation is then performed for setting the UNI port 210A of the remote network element 210 to be in loop-back mode such that all test frames egressing therefrom will be looped back with the source and destination MAC addresses thereof being swapped (i.e., operating in a traffic loop-back role). The local network element 204 then generates a burst test frames (e.g., 10 seconds of 64 byte frames) and injects the test frames into the UNI port 204A of the local network element 204 (i.e., operating in a traffic generator role). The test frames, which can be subject to ingress and egress QOS SLA in local network element 204, are forwarded from the local network element 204 through the carrier network 212 to the UNI port 210A of the remote network element 210. Once at the UNI port 210A of the remote network element 210, the test frames being egressed at the UNI port 210A of the remote network element 210 re-injected into the UNI port 210A of the remote network element 210 (i.e., with their source and destination MAC addresses being swapped) thereby causing such test packets to be forwarded back to the local network element 204. After a frame generation/transmission portion of the method ends (e.g., the last of the test frames are received and/or a designed duration of frame generation has elapsed), the local network element 204 then analyses transmission of the test packets between the UNI ports 204A, 210A of the local and remote network elements 204, 210 (i.e., also operating in a traffic analyzer role). This analysis preferably includes using frame counts to determine attributes such as frame loss, frame delay, and frame delay variance. Preferably, frame loss can have two components: a first component relating to an ingress frame loss between the number of test frame injected and sent in the local network element 204 and a second component relating to an end-to-end frame loss between the number of test frame injected and received in the local network element 204.

Figure 2B:
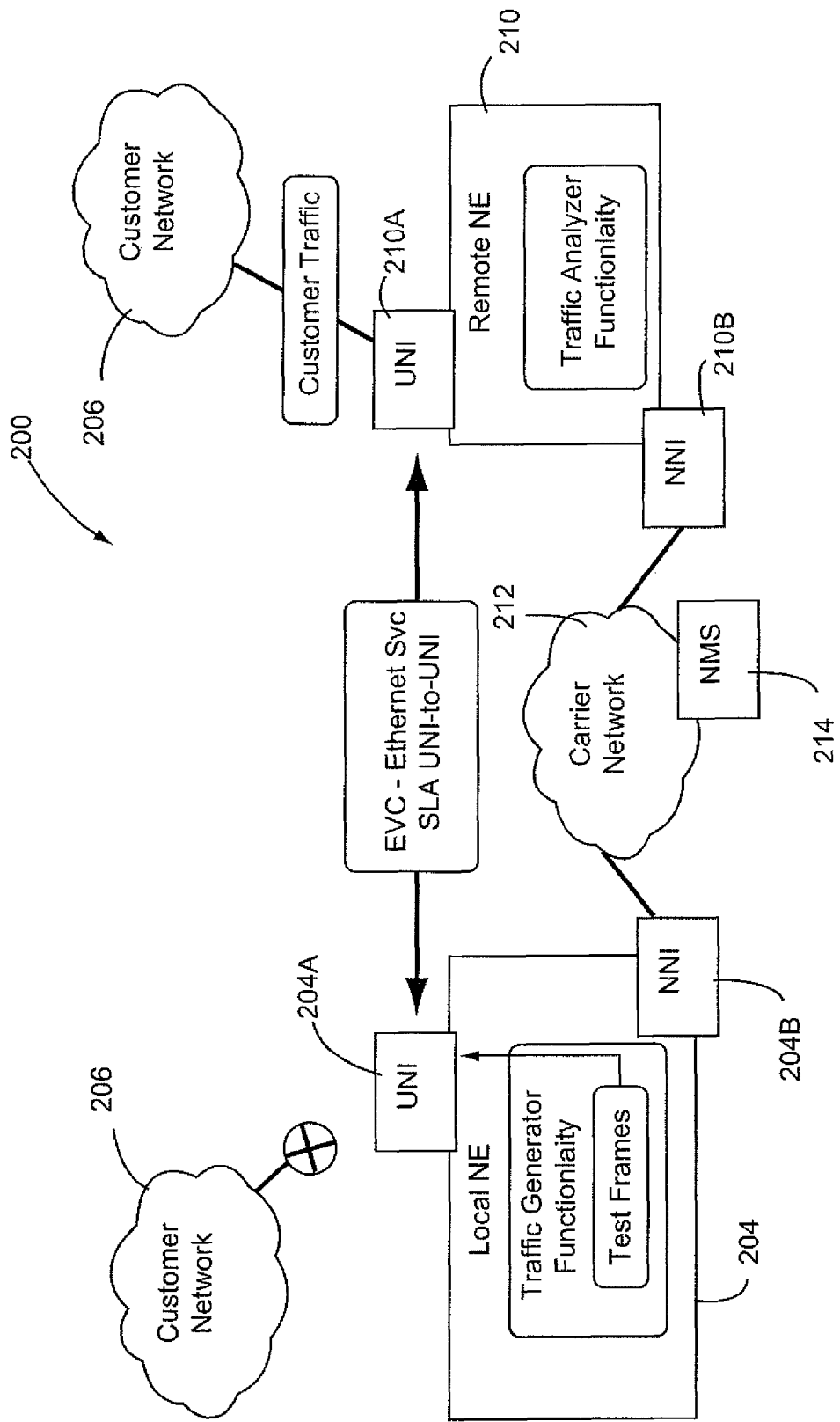
FIG. 2B is a diagrammatic view relating to a method configured in accordance with an embodiment of the present invention for carrying out SLA UNI-to-UNI verification of EVC Ethernet Service utilizing an out-of-service uni-directional test mode.

Referring now to FIG. 2B, a method configured in accordance with an embodiment of the present invention for carrying out SLA UNI-to-UNI verification of EVC Ethernet Service utilizing an out-of-service uni-directional test mode is presented. This uni-directional test mode method is discussed in reference to the network system 200, which has been discussed in detail in reference to FIG. 2A. The uni-directional test mode method begins with an operation for setting the local UNI port 204A to being out-of-service. Accordingly, communication between the local network element 204 via its respective UNI port 204A is disabled. An operation is then performed for causing the local network element 204 to generate a burst test frames (e.g., 10 seconds of 64 byte frames) and injects the test frames into the UNI port 204A of the local network element 204 (i.e., operating in a traffic generator role). The test frames, which can be subject to ingress and egress QOS SLA in local network element 204, are forwarded from the local network element 204 through the carrier network 212 to the UNI port 210A of the remote network element 210. Once at the UNI port 210A of the remote network element 210, the test frames are discarded by the remote network element 210. After a frame generation/transmission portion of the method ends (e.g., the last of the test frames are received and/or a designed duration of frame generation has elapsed), the local network element 204 then analyses transmission of the test packets between the UNI ports 204A, 210A of the local and remote network elements 204, 210 (i.e., operating in a traffic analyzer role). This analysis preferably includes using frame counts to determine attributes such as frame loss, frame delay, and frame delay variance. Preferably, frame loss can have two components: a first component relating to an ingress frame loss between the number of test frame injected and sent in the local network element 204 and a second component relating to an end-to-end frame loss between the number of test frame injected and received in the local network element 204.

Discussed now is a network management system (NMS) agent configured in accordance with the present invention for allowing an operator to manage method for performing and/or information associated with validation of EVC for Ethernet Service. In one preferred embodiment, the NMS agent is configured in accordance with Simple Network Management Protocol (SNMP) for allowing an operator to perform tests between end points of an Ethernet Service in accordance with IEEE (Institute of Electrical and Electronic Engineers) RFC (Request For Comments) 2544. Advantageously, this NMS framework provides a great flexibility and ease to a network administrator for validating the service level agreement (SLA) provided to network customers and can be specifically configured for use in managing network elements that support the integrated test head capability discussed above in reference to FIGS. 2A and 2B.

The NMS is configured for defining management objects and an object framework required to configure and execute a test between a local and remote network element (e.g., the local network element 204 and the remote network element 210 discussed above in reference to FIGS. A and 2B) using SNMP, for providing a management framework which provides a unified view of the tests and the underlying participating network elements, and/or for defining a framework to develop NMS applications for achieving RFC 2544 tests. The NMS (e.g., an agent thereof) provides an architectural framework whereby different network elements within a network (e.g., the local network element 204 and the remote network element 210 discussed above in reference to FIGS. A and 2B) can be configured to participate in a SLA verification test. To this end, the NMS can be configured to assign different test roles to participating network elements. As discussed above in reference to FIGS. 2A and 2B, such roles can include roles whereby a network element provides traffic generator functionality, traffic analyzer functionality, and/or traffic loopback functionality. Furthermore, the NMS is preferably configured to have the flexibility of running uni-directional and/or bi-directional tests between the end devices (e.g., as disclosed above in reference to FIGS. 2A and 2B). The underlying objective for the NMS is to support tests utilized in validating SLA for customer traffic by generating test traffic (e.g., similar to customer traffic flow) on demand to test the behavior of a network system in response to the test traffic stream. Preferably, these tests can provide flexibility in terms of test packet frames, duration of a test, test frame size, frame generation burst size/duration, etc as necessary to perform a required assessment of traffic (e.g., in accordance with RFC 2544) between two end points within a network system. Upon completion of test frame generation and transmission, the NMS shall be able to fetch appropriate statistics from the local and/or remote network elements for providing a consolidated assessment of network system performance.

Figure 3:
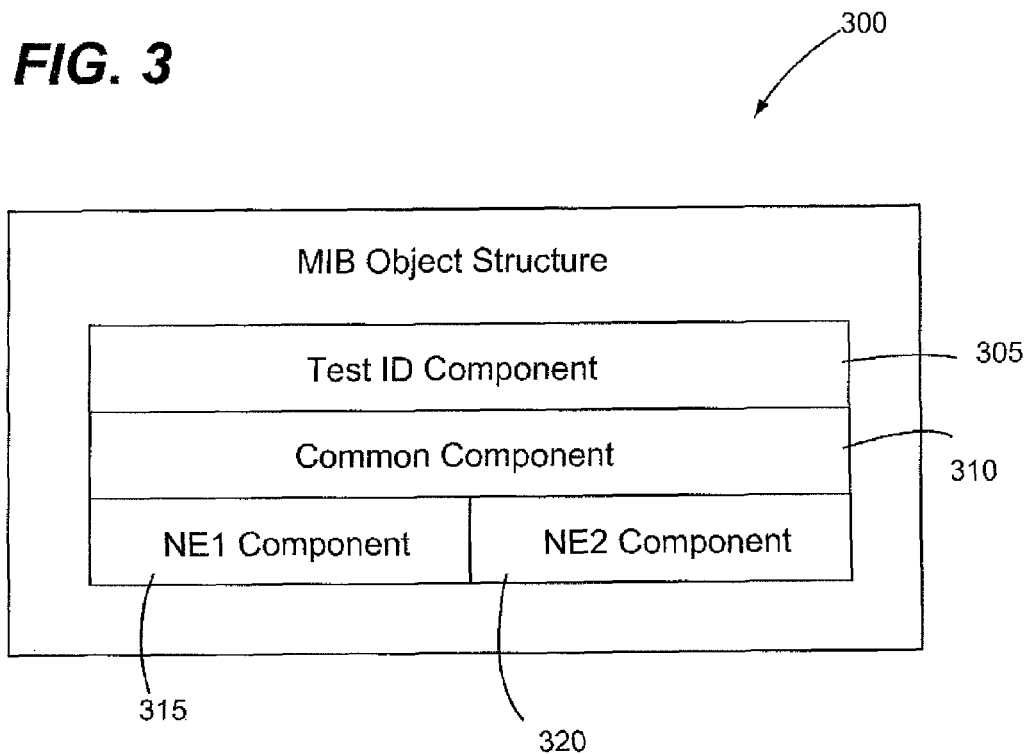
FIG. 3 shows a management information base (MIB) object structure configured in accordance with the present invention.

FIG. 3 shows a management information base (MIB) object structure 300 configured in accordance with the present invention for providing a management view of information required for and resulting from validation of EVC for Ethernet Service. The MIB object structure 300 includes a test identifier component 305, a common component 310, a local network element component 315 (i.e., NE1 component), and a remote network element component 320 (i.e., NE2 component). The test identifier component 305 defines a particular EVC validation test. The common component 310 defines common test attributes on both local and remote network elements of an EVC validation test. One such common test attribute includes identifying information for the local (i.e., source) network element. Another such common test attribute includes identifying information for the remote (i.e., destination) network element. Examples of identifying information for the local and remote network elements include, but are not limited to, a network element system name, based MAC address, full qualified domain name or the management address or even an Ethernet-specific identifier. Another such common test attribute includes test mode information for specifying a test mode (e.g., in-service or out-of-service). Another such common test attribute includes test direction information specifying a direction of the test (e.g., uni-directional or bi-directional). Another such common test attribute includes a test frame signature for uniquely identifying test frames verses non-test frames. Still another such common test attribute includes information designating an Ethernet Service name, which is used for limiting a scope of the test frames within the Ethernet Service that needs to be tested.

The local network element component 315 and the remote network element component 320 are each a network element (e.g., bridge) component that defines specific test attributes for a respective network element. One such network element-specific test attribute includes an operation role that a particular network element is exhibiting. As discussed above, examples of operational roles include, but are not limited to an operational role for providing traffic generator functionality, an operation role for providing traffic analyzer functionality, an operational role for providing traffic loop-back functionality, or a combination thereof. In one embodiment, operational role is implicitly derived from the test common component (e.g., type of test and direction of test) and cannot be set by management. Another such network element-specific test attribute includes information specifying an interface of the particular network element (e.g., a network interface port number). For a network element providing traffic generator functionality, this interface specifying information defines the UNI port on which the test traffic is injected. For a network element providing traffic loop-back functionality, this interface specifying information defines the UNI port to configure for providing loop-back function. Another such network element-specific test attribute includes information designating a source-learning mode, which is only applicable for a network element actively providing traffic analyzer functionality in a uni-directional test and, when enabled, causes this network element to send a suitable number of test frames for source learning purposes. Another such network element-specific test attribute includes information defining a frame format mode. In one embodiment, two frame format modes are provided: a file mode in which frame content is read from a file containing the hexadecimal string of the frame and a configuration mode in which frame content and headers are configurable through management objects for L2, virtual local area network (VLAN) Tag, L3, L4 headers and payload data. Another such network element-specific test attribute includes information defining packet size. Another such network element-specific test attribute includes information defining a transmit rate for test frames. In one embodiment, the transmit rate can be configured as packet per seconds or bits per seconds. Another such network element-specific test attribute includes information defining test duration. In one embodiment, test duration can be configured as duration of time or number of frames. Another such network element-specific test attribute includes information defining when a network element starts execution of its test role and/or defining when the network element stops the execution of its test role. Another such network element-specific test attribute includes information defining a status of a particular network element for a given test. Examples of such status include, but are not limited to, a status of indicating that the test has been configured but has not started (i.e., not started status), a status indicating a test has started and is running (i.e., a started status), a status indicating that the test has ended and all test frames have been sent (i.e., an ended status), and a status indicating that the test has been stopped such as by management (i.e., a stopped status). Still another such network element-specific test attribute includes information relating to statistics derived from a test. Examples of such statistics include, but are not limited to, a statistic relating to a number of test frames that have been injected at a port of a network element (i.e., a TX-ingress counter), a statistic relating to a number of test frames that have been sent out at a port of a network element (i.e., a TX-egress counter), a statistic relating to a number of test frames that have been received at a port of a network element (i.e., a RX counter), a statistic relating to a minimum, average and/or maximum packet delay measured for the duration of a particular test, and a statistic relating to a minimum, average and maximum variance of the packet delay measured for the duration of a particular test.

It is disclosed herein that a NMS configured in accordance with the present invention can utilize an SNMP trap from one or more network elements to notify the NMS about an actual status of a test. Preferably, two SNMP traps are provided. A first SNMP trap (i.e., a Test-RX-Ready trap) is sent to the NMS after the remote network element in an analyzer or loop-back role is ready to receive test traffic. After this trap is received by NMS, the test functionality being provided by this network element can be started. A second SNMP trap (i.e., Test-TX-Done trap) is sent to the NMS from the network element in the traffic generator role after the test has ended With regard to activation of a test, after a test has been configured, the test can be started (i.e., activated). Only one test can be activated per network element. The test is activated by suitably configuring (e.g., setting) a respective network element component of a corresponding MIB object structure. It is disclosed herein that the test usually comprises of generating and analyzing one test frame stream but is not limited to a single stream. For example, multiple test frame patterns can be generated to test the EVC with concurrent streams at different priority and rate When starting a uni-directional test, the destination end point (i.e., network element providing traffic analyzer functionality) must be started first. According to the test configuration, this network element initializes its filtering engine to count the test frames. If source learning is enabled, a suitable number of test frames are also sent for source learning purposes. Thereafter, a Test-RX-Ready trap is sent to NMS. After the NMS receives the Test-RX-Ready trap, the source end point (i.e., the network element providing traffic generator functionality) is started. In this manner, the traffic generator network element initializes its filtering engine to count the ingress and egress test frames and injects the test frame for the duration of the test. When the test ends, a Test-TX-Done trap is sent to NMS.

When starting a bi-directional test, the destination end point (i.e., network element providing traffic analyzer functionality) must to be started first. This traffic analyzer network element activates the loop-back functionality for test frames and, thereafter, a Test-RX-Ready trap is sent to NMS. After the NMS receives the Test-RX-Ready trap, the source end point (i.e., the network element providing traffic generator functionality) is started. This traffic generator network element initializes its filtering engine to count the ingress and egress test frames and injects the test frame for the duration of the test. When the test ends, a Test-TX-Done trap is sent to NMS.

It is disclosed herein that a framework in accordance with the present invention can be provided to develop NMS applications for achieving RFC 2544 tests. In one embodiment, a basic SNMP framework is configured for allowing a simple test to be executed. More specifically, a single traffic stream for a given packet size and duration can be started and performance measurements can be retrieved and/or calculated from MIB counter information. Examples of such performance measurements include, but are not limited to, packet loss, packet delay, and packet delay variation.

It is also disclosed herein that this basic SNMP framework can be extended to provide advanced test script capabilities. In one embodiment, such an extended SNMP framework is configured for allowing an NMS agent (e.g., a NMS application) to support pre-configured RFC 2544 scripts that consist of executing multiple basic tests. One example of such a pre-configured script related to frame rate test for all packet sizes in which multiple iterations of a test are performed with packet size increment according to RFC 2544. Another example of such a pre-configured script relates to a throughput test in which multiple iterations of a test are performed with fixed packet size and duration and variable rate. The objective of such a throughput test is to find the maximum frame transmission rate that does not expose frame loss. The throughput test can also support incremental packet size. Still another example of such a pre-configured script relates to a burst test in which multiple iterations of a test are performed with fixed packet size and transmission rate and variable burst size in number of frames. The objective of such a burst test is to find the maximum burst size that can be transmitted at wire rate and does not expose frame loss. The burst test can also support incremental packet size.

Referring now to computer readable medium, it will be understood from the inventive disclosures made herein that methods, processes and/or operations adapted for carrying out network element role control functionality for performing validation of EVC for Ethernet Service as disclosed herein are tangibly embodied by computer readable medium (e.g., a non-transient computer readable medium) having instructions thereon for carrying out such functionality. In one specific embodiment, the instructions are tangibly embodied for carrying out SLA UNI-to-UNI verification of EVC Ethernet Service utilizing an out-of-service bi-directional test mode as discussed above in reference to FIG. 2A and/or for carrying out SLA UNI-to-UNI verification of EVC Ethernet Service utilizing an out-of-service uni-directional test mode as discussed above in reference to FIG. 2B. The instructions can be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the inventive disclosures made herein include a compact disk, a hard drive, RAM or other type of storage apparatus that has imaged thereon a computer program (i.e., a set of instructions) adapted for carrying out network element role functionality for performing validation of EVC for Ethernet Service in accordance with the disclosures made herein. Furthermore, such instructions, one or more data processing devices, and memory apparatus are jointly one embodiment of circuitry configured for providing network element role control functionality in accordance with the present invention.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A network element in an Ethernet network, comprising:
  circuitry configured for providing traffic generator functionality to generate test frames at any combination of packet size and frame generation rate, uniquely identify said test frames and non-test frames through use of a respective signature thereof, associate a hardware timestamp with each one of said test frames and maintain a count of said test frames transmitted from the network element;
  circuitry configured for providing traffic analyzer functionality to maintain a count of test frames received at the network element, filter said test frames dependent upon the respective signature thereof, associate a hardware timestamp with each one of said test frames and calculate a frame delay for each one of said test frames; and
  circuitry configured for providing traffic loop-back functionality to uniquely identify each one of said test frames dependent upon the respective signature thereof, selectively activate a network element loop-back mode for re-injecting test frames egressing an interface of the network element back into the interface and swap test frame source and destination MAC addresses during said re-injection;
  wherein said circuitries are configured for selectively enabling the network element to support a unidirectional test mode and a bi-directional test mode and for enabling the network element to be selectively operated as a local network element and a remote network element;
  wherein said circuitries are further configured for selectively enabling the network element to support an in-service test mode and an out-of-service test mode such that all non-test frames are discarded in the out-of-service test mode.

2. The network element of claim 1 wherein:
  said circuitry configured for providing traffic generator functionality is active when the network element is operating as a local network element during the uni-directional test mode; and
  said circuitry configured for providing traffic analyzer functionality is active when the network element is operating as a remote network element during the uni-directional test mode.

3. The network element of claim 1 wherein:
  said circuitry configured for providing traffic generator functionality and said circuitry configured for providing traffic analyzer functionality are active when the network element is operating as a local network element during the bi-directional test mode; and
  said circuitry configured for providing traffic loop-back functionality is active when the network element is operating as a remote network element during the bi-directional test mode.

4. The network element of claim 1 wherein said traffic generator functionality further includes:
  designating a packet size of each one of said test frames;
  designating a duration of a test mode under which said test frames are transmitted; and
  designating an identifier of a network element interface on which said test frames are to be injected.

5. A non-transient computer-readable medium having tangibly embodied thereon and accessible therefrom a set of instructions interpretable by at least one data processing device, said set of instructions configured for causing said at least one data processing device to performed operations for:
  providing traffic generator functionality to generate test frames at any combination of packet size and frame generation rate, uniquely identify said test frames and non-test frames through use of a respective signature thereof, associate a hardware timestamp with each one of said test frames and maintain a count of said test frames transmitted from the network element;
  providing traffic analyzer functionality to maintain a count of test frames received at the network element, filter said test frames dependent upon the respective signature thereof, associate a hardware timestamp with each one of said test frames and calculate a frame delay for each one of said test frames; and providing traffic loop-back functionality to uniquely identify each one of said test frames dependent upon the respective signature thereof, selectively activate a network element loop-back mode for re-injecting test frames egressing an interface of the network element back into the interface and swap test frame source and destination MAC addresses during said re-injection;

wherein said operations are performed in a manner for selectively enabling the network element to support a unidirectional test mode and a bi-directional test mode and for enabling the network element to be selectively operated as a local network element and a remote network element wherein said operations are performed in a manner for selectively enabling the network element to support an in-service test mode and an out-of-service test mode such that all non-test frames are discarded in the out-of-service test mode.

6. The non-transient computer-readable medium of claim 5 wherein:

providing traffic generator functionality is performed when the network element is operating as a local network element during the uni-directional test mode; and providing traffic analyzer functionality is performed when the network element is operating as a remote network element during the uni-directional test mode.

7. The non-transient computer-readable medium of claim 5 wherein:

providing traffic generator functionality and said circuitry configured for providing traffic analyzer functionality are performed when the network element is operating as a local network element during the bi-directional test mode; and providing traffic loop-back functionality is performed when the network element is operating as a remote network element during the bi-directional test mode.

8. The non-transient computer-readable medium of claim 5 wherein said traffic generator functionality further includes:

designating a packet size of each one of said test frames;

designating a duration of a test mode under which said test frames are transmitted; and designating an identifier of a network element interface on which said test frames are to be injected.

9. A network element configured for routing traffic within an Ethernet network, comprising:

at least one data processing device;

instructions processable by said at least one data processing device; and an apparatus from which said instructions are accessible by said at least one data processing device;

wherein said instructions are configured for causing said at least one data processing device to:

provide traffic generator functionality, wherein causing said at least one data processing device to provide said traffic generator functionality includes causing said at least one data processing device to generate test frames at any combination of packet size and frame generation rate, uniquely identify said test frames and non-test frames through use of a respective signature thereof, associate a hardware timestamp with each one of said test frames, maintain a count of said test frames transmitted from the network element, and support both an in-service test mode and an out-of service test mode;

provide traffic analyzer functionality, wherein causing said at least one data processing device to provide said traffic analyzer functionality includes causing said at least one data processing device to maintain a count of test frames received at the network element, filter said test frames dependent upon the respective signature thereof, associate a hardware timestamp with each one of said test frames, and calculate a frame delay for each one of said test frames; and provide traffic loop-back functionality, wherein causing said at least one data processing device to provide said traffic loop-back functionality includes causing said at least one data processing device to uniquely identify each one of said test frames dependent upon the respective signature thereof, selectively activate a network element loop-back mode for re-injecting test frames egressing an interface of the network element back into the interface, swapping test frame source and destination MAC addresses during said re-injection, and support both the in-service test mode and the out-of-service test mode;

wherein said functionalities are jointly configured for selectively enabling the network element to support a unidirectional test mode and a bi-directional test mode and for enabling the network element to be selectively operated as a local network element and a remote network element;

wherein said functionalities are jointly configured for discarding all said non-test packets in the out-of-service test mode.

10. The network element of claim 9 wherein:

said traffic generator functionality is provided when the network element is operating as a local network element during the uni-directional test mode; and said traffic analyzer functionality is provided when the network element is operating as a remote network element during the uni-directional test mode.

11. The network element of claim 9 wherein:

said traffic generator functionality and said circuitry configured for providing traffic analyzer functionality are provided when the network element is operating as a local network element during the bi-directional test mode; and said traffic loop-back functionality is provided when the network element is operating as a remote network element during the bi-directional test mode.

12. The network element of claim 9 wherein causing said at least one data processing device to provide said traffic generator functionality further includes causing said at least one data processing device to:

designate a packet size of each one of said test frames;

designate a duration of a test mode under which said test frames are transmitted; and designate an identifier of a network element interface on which said test frames are to be injected.

13. The network element of claim 12 wherein:

said traffic generator functionality is provided when the network element is operating as a local network element during the uni-directional test mode;

said traffic analyzer functionality is provided when the network element is operating as a remote network element during the uni-directional test mode;

said traffic generator functionality and said circuitry configured for providing traffic analyzer functionality are provided when the network element is operating as a local network element during the bi-directional test mode; and said traffic loop-back functionality is provided when the network element is operating as a remote network element during the bi-directional test mode.

* * * * *